Dec. 2, 1952   C. VOLFF   2,620,422
ARC WELDING APPARATUS
Filed Aug. 3, 1951
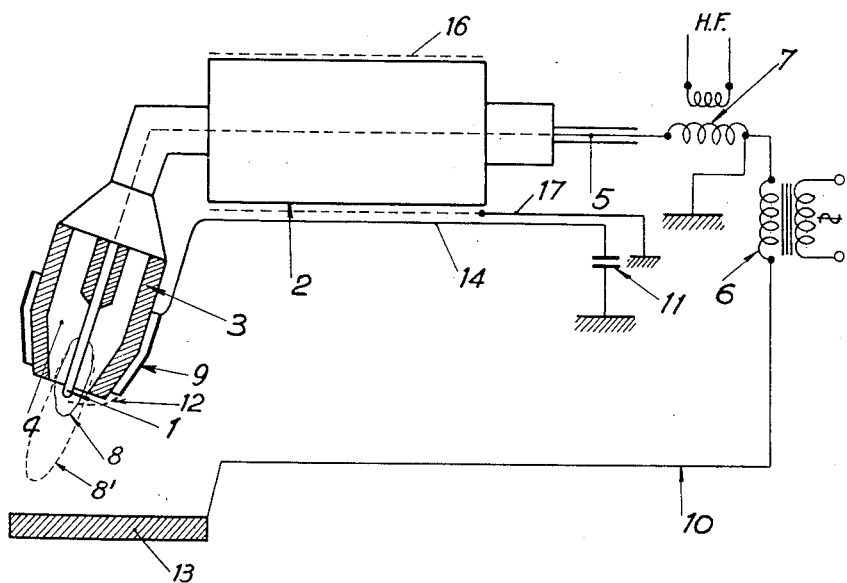
Inventor
Charles Volff
By
Attorney Patented Dec. 2, 1952

2,620,422

UNITED STATES PATENT OFFICE 2,620,422

ARC WELDING APPARATUS

Charles Volff, Montreal, Quebec, Canada, assignor to L'Air Liquide, Societe Anonyme pour l'Etude et l'Exploitation des Procedes Georges Claude, Paris, France Application August 3, 1951, Serial No. 240,153
In France August 31, 1950

6 Claims. (Cl. 219—8)

My invention has, as a main object, an apparatus for welding and a process for its use, more particularly for facilitating the starting and the stabilizaiton of a welding arc between an electrode surrounded by a hollow insulating piece and a workpiece for use with alternating or direct current, the insulating piece being a gas nozzle in case a shielding gas is fed around the electrode.

More specifically, it is an object of the invention to provide in such cases an intermediate high frequency arc or spark discharge produced between the electrode and the work piece.

Another object is to provide a luminous or corona discharge produced around the electrode and elongated towards the work, thus enabling a high frequency arc or spark discharge to appear for the initiation of the welding arc at a distance, that is without the end of the electrode touching the work piece.

Another object is to initiate and sustain the luminous or corona discharge when the electrode is maintained far apart from the work piece, the welding arc being struck at distance when the electrode is neared to the work piece.

Another object is to stabilize the luminous or corona discharge, independently of the capacity of the welding electrode holder or torch with respect to ground, and to neighbouring objects, which capacity is subject to variations according to the welding conditions.

The present starting method applies particularly to the case of welding operations utilizing a bare metal electrode, nonconsumable, surrounded with a stream of shielding gas, for instance a monoatomic gas such as argon or helium.

Heretofore the initiation of the welding arc is usually obtained by a high frequency produced by a spark gap generator. Regulations prohibiting the generation of stray waves which are liable to disturb radio transmissions and generally all applications of radio-frequency waves make it necessary to use high frequency generators having a well defined and stable frequency, and such conditions can be met easily only by generators utilizing electronic tubes.

In case such generators are used, the obtention of a high frequency voltage on the electrode, high enough to allow the initiation of the welding arc at a distance, requires a very high frequency voltage which is difficult to obtain and requires high power generators or complicated devices.

The present invention obviates these drawbacks and is particularly suitable for the use of electronic high frequency generators.

The invention may be briefly summarized as follows. It comprises an arc welding apparatus which has an electrode connected to a welding current source of which the other pole is connected to the workpiece. The electrode is surrounded by an insulating piece. An electrically conducting ring surrounds the exterior of the insulating piece. There are respective direct connections between the electrode and the workpiece and respective poles of a high frequency generator producing continuous waves. There is an indirect connection between the conducting ring and the pole of the high frequency generator which is connected to the workpiece. which connection includes a capacitor having a high reactance to the welding current. The distance between the electrode and the conducting ring in respect of the high frequency potential is sufficiently high to produce a luminous discharge around the electrode. The ring is placed on the front part of the insulating piece whereby it is adapted to produce the luminous discharge around the front part of the electrode.

The accompanying drawing shows by way of example an apparatus for carrying out this invention, the single figure being a diagrammatic view of said apparatus.

The reference numeral 1 denotes an electrode made for instance of nonconsumable metal which is supported by an electrode-holder or welding torch 2 terminated by an electrically insulating nozzle 3 surrounding the extremity of electrode 1 to provide in the annular space 4 the passage of an inert shielding gas for shielding the arc. Electrode 1 is connected to a transformer 6 furnishing the welding current and to a winding 7 in which is induced the high frequency current (for instance 10 megacycles) produced by a generator not shown.

The insulating nozzle 3 is surrounded in its front part by a conducting ring 9 connected either to the welding current conductor 10 which assures the return of current from the piece to be welded to the transformer or to the work 13 to be welded. This conductor 13 is preferably placed on the exterior of the insulating material body 15 of the apparatus. In order to avoid welding current passing through this conductor, a condenser 11 is branched between ring 9 and return cable 10; this condenser must show a low impedance at the high frequency which is utilized and a high impedance at the frequency of the welding current. The high frequency voltage of the high frequency generator thus appears between electrode 1 and ring 9 and there is produced for a sufficient high frequency voltage a luminous discharge or corona surrounding the electrode. When the electrode is far from the work, the luminous discharge shows the form 8 shown by full lines; when the electrode is neared to the work, the luminous zone becomes longer towards the work due to the high potential gradient existing between the electrode and the work than between the electrode and the ring and assumes the form 8' shown in dotted lines. This lengthening gives rise to an intermediate high frequency arc or spark discharge, then to a welding arc as soon as the distance between electrode and piece has become small enough.

In order to avoid the formation of an arc between electrode 1 and ring 9 the front part 11 of the insulating nozzle 3 must project relatively to the ring so that the path 12 around the nozzle 3 along which the high frequency spark between electrode and said ring could strike is longer than the sparking distance between electrode and ring for the high frequency voltage which is utilized. The same method can be utilized with a high frequency voltage which is insufficient for obtaining the self striking of the corona discharge when the electrode is cold. In that case the corona discharge is caused to be struck by touching with the electrode even placed far from the work a metallic piece which is preferably insulated as to the welding circuit having a low capacity relatively to the ground, this piece having possibly however a few square surface centimeters, for instance a fountain pen clip or the metallic part of a screw driver with an insulating handle. The electrode thus surrounded by the luminous discharge is then neared to the work and the welding arc is then struck in the same manner as above described.

The insulating body or handle 14 is surrounded by a metallic perforated screen 16 connected to the ground by conductor 17.

From the above it will be seen that without the presence of the metallic ring 9 the luminous or corona discharge which can be easily started by contacting the electrode with a metallic piece such as the welding table, maintains by itself only if the electrode remains in the neighbourhood of such metallic part; ring 9 enables this discharge to be sustained for any position of the welding torch relatively to any metal part acting in a similar way as a pilot flame to a gas burner.

What I claim is:

1. An arc welding apparatus having an electrode connected to a welding current source the other pole of which is connected to the workpiece, said electrode being surrounded by an insulating piece, an electrically conducting ring surrounding the exterior of the said insulating piece, said electrode and said workpiece having respective direct connections to the respective poles of a high frequency generator producing continuous waves, an indirect connection only between said ring and the pole of said high frequency generator which is connected to the workpiece, said indirect connection including a capacitor having a high reactance to the welding current, the distance between the electrode and the ring in respect of the high frequency potential being sufficiently high to produce a luminous discharge around the electrode, said ring being placed on the front part of the insulating piece whereby it is adapted to produce the said luminous discharge around the front part of the electrode.

2. An arc welding apparatus, according to claim 1, having an insulating handle, in which said ring is connected to the ground through an electric conductor placed along the exterior of the insulating handle.

3. An arc welding apparatus, according to claim 2, in which the insulating handle is surrounded by a metallic grounded screen.

4. An arc welding apparatus, according to claim 3, in which the insulating piece projects beyond said ring between it and the electrode, thus providing for the possible discharge between the electrode and the metallic piece, a path in the air longer than the sparking discharge distance at the high frequency voltage existing between said electrode and said ring.

5. An arc welding apparatus, according to claim 1, in which said connection is to the ground through an electric conductor and a capacitor in series with said conductor, the capacitor having a high reactance to the welding current and a small reactance to the high frequency current.

6. An arc welding apparatus according to claim 1, having an insulating handle, in which said connection is to the ground through an electric conductor and a capacitor in series with said conductor, the conductor being placed along the exterior surface of the insulating handle.

CHARLES VOLFF.

REFERENCES CITED

The following references are of record in the file of this patent:

UNITED STATES PATENTS

| Number | Name | Date |
|---|---|---|
| 2,423,515 | Morris | July 8, 1950 |
| 2,516,016 | Pakala | July 8, 1950 |
| 2,516,037 | Williams | July 18, 1950 |
| 2,532,807 | Girard | Dec. 5, 1950 |